United States Patent [19]
Bunte et al.

[11] 3,711,235
[45] Jan. 16, 1973

[54] EXTRUSION DIE DECKLE MEANS

[75] Inventors: William S. Bunte, Somerville; Lino E. DeGasperis, Clinton, both of N.J.

[73] Assignee: Egan Machinery Company, Somerville, N.J.

[22] Filed: Nov. 10, 1971

[21] Appl. No.: 197,271

Related U.S. Application Data

[63] Continuation-in-part of Ser. No. 154,138, June 17, 1971, which is a continuation-in-part of Ser. No. 108,459, Jan. 21, 1971, Pat. No. 3,694,132.

[52] U.S. Cl. ................................................425/466
[51] Int. Cl. ................................................B29d 7/04
[58] Field of Search..............................425/466, 381

[56] References Cited

UNITED STATES PATENTS

| | | | |
|---|---|---|---|
| 3,293,689 | 12/1966 | Chiselko | 425/466 |
| 3,133,313 | 5/1964 | Corbett | 425/466 |
| 3,132,377 | 5/1964 | Allenbaugh et al. | 425/466 |
| 3,018,515 | 1/1962 | Sneddon | 425/466 |
| 2,982,995 | 5/1961 | Groleau | 425/466 |

*Primary Examiner*—J. Spencer Overholser
*Assistant Examiner*—B. D. Tobor
*Attorney*—F. J. Pisarra

[57] ABSTRACT

An extrusion die having a discharge orifice in the form of a relatively long narrow slot and adapted to extrude a film or sheet of a flowable plastic material. The die is equipped with known external deckle means adjustably positioned along the outer end of the discharge orifice and improved internal deckle means adjustably positioned along the inner end of the discharge orifice. The external and internal deckle means are adjustable in unison or separately, as desired, along corresponding ends of the discharge orifice. The die and the external and internal deckle means are so constructed and arranged as to effectively regulate and control both the width and the thickness of a plastic film or sheet that is extruded from the die.

12 Claims, 15 Drawing Figures

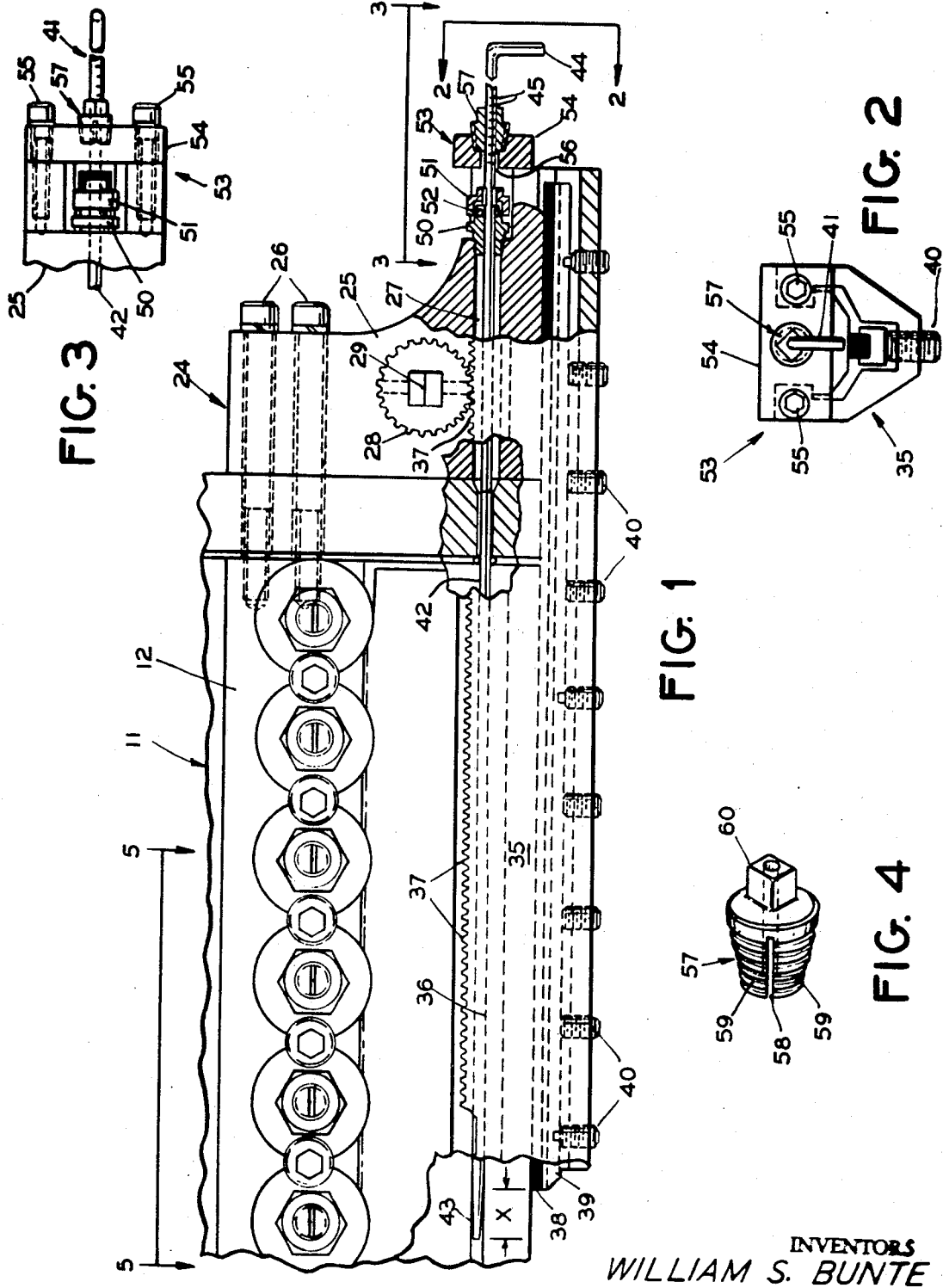

INVENTORS
WILLIAM S. BUNTE
LINO E. DE GASPERIS
BY F. J. Pisarra
ATTORNEY

PATENTED JAN 16 1973 3,711,235
SHEET 3 OF 3
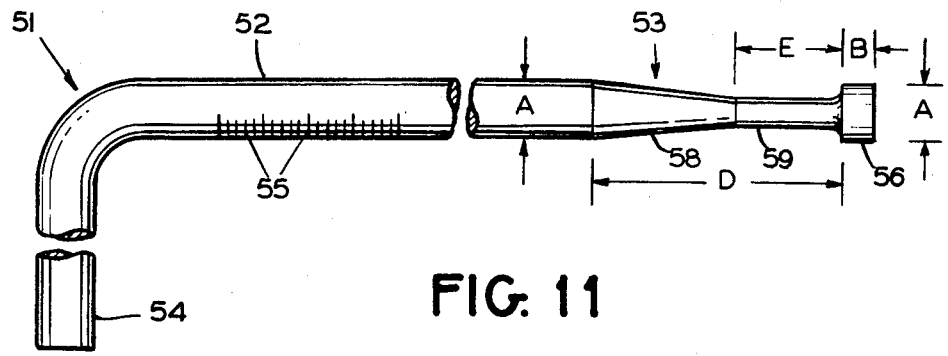
FIG. 11
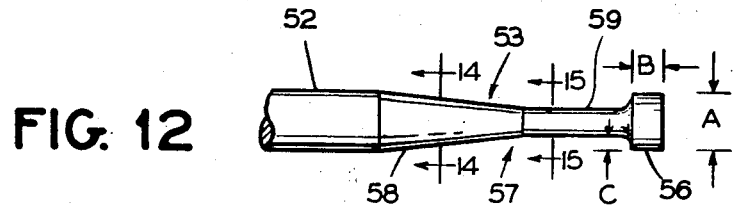
FIG. 12
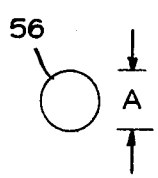   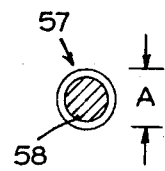   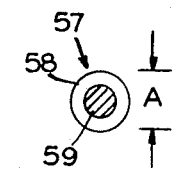
FIG. 13    FIG. 14    FIG. 15
INVENTORS
WILLIAM S. BUNTE
LINO E. DE GASPERIS
BY F. J. Pisarra
ATTORNEY

EXTRUSION DIE DECKLE MEANS

This application is a continuation-in-part of our pending patent application Ser. No. 154,138, filed June 17, 1971, which is a continuation-in-part of our pending patent application Ser. No. 108,459, filed Jan. 21, 1971 now U.S. Pat. No. 3,694,132.

BACKGROUND OF THE INVENTION

This invention relates to the art of extruding plastic materials and, more particularly, to an extrusion die having a discharge orifice in the shape of a long narrow slot and including an improved arrangement of deckle means associated with the slot for readily and effectively regulating the width and the thickness of a plastic film or sheet extruded from the die.

It is important and desirable from the viewpoint of economics that extruded plastic film or sheet material be uniform in width and thickness at the time of formation. So far as we have been able to ascertain and except as disclosed in our said applications Ser. No. 108,459 and Ser. No. 154,138, presently known plastic extruders are not capable of extruding films or sheets that are uniform both in width and in thickness.

Satisfactory regulation and control of the width of extruded plastic films is attained by employment of an external deckle of the type disclosed in U.S. Pat. No. 3,293,689 to Chiselko et al. However, the problem of non-uniform film thickness is not solved by the use of the Chiselko et al or similar types of external deckles. In other words, known external deckles are capable of effectively regulating only the width of extruded plastic films but are incapable of also regulating the thickness of such films.

Non-uniform or uneven film thickness is characterized by regions of greatly increased thickness along the edges of the film, known as "edge beads." These beads are caused by contraction in width of the film along its edges after the film leaves the die. Such contraction is commonly referred to as "neck in." The amount of neck in and the resulting edge beads varies with the characteristics of particular plastic materials including viscosity, surface tension, etc. In the manufacture of useful and commercially acceptable products utilizing plastic films, the edge beads must be severed from the film or from a combined film and substrate. This is uneconomical as it results in substantial increases in labor and equipment costs and considerable losses in materials.

Over the years, there have been a number of developments directed to the elimination or minimization of formation of edge beads in plastic films by the use of internal deckles. Such developments are exemplified by the constructions disclosed in corresponding United States patents including No. 2,712,155 to Nelson, No. 2,982,995 to Groleau, No. 3,018,515 to Sneddon and No. 3,107,191 to Brownold. Each of these developments, while helpful in reducing the creation of edge beads on extruded film, has operating disadvantages which have mitigated against general acceptance and use in the plastics extrusion coating and casting industry. For example, the deckle rod of U.S. Pat. No. 2,982,995 must be located very close to the discharge end of the die orifice in order to reduce travel of the plastic material toward the ends of the die after it passes the deckle rod. Such travel cannot be adequately controlled, thereby resulting in objectionable instability in the width of the extruded film. Moreover, shortening the distance from the deckle rods to the discharge end of the die orifice, which distance is known as the "land length," results in poor quality extruded film in the case of many of the commonly used plastic materials.

We have discovered that both the width and the edge thickness of a plastic film extruded from a slot type orifice die can be effectively regulated and controlled by the use of external and internal deckle means in combination with a slot type orifice die in accordance with this invention. As will be explained further along herein and shown in the drawings, the external deckle means is preferably of the type disclosed in said Chiselko patent and the internal deckle means is preferably of the form described herein.

SUMMARY OF THE INVENTION

The present invention is comprised of the combination of a die for extruding films or sheets of flowable plastic material, external deckle means and internal deckle means. The die has a discharge orifice in the form of a relatively long narrow slot. One extremity of the orifice constitutes an inlet which communicates with a manifold for containing a supply of the plastic material in molten state. The other extremity of the orifice constitutes an outlet which communicates with the atmosphere. The inlet and the outlet are coextensive with the length of the slot. The external deckle means is carried by the die and seals an end portion of the orifice outlet. The internal deckle means extends into the die and seals an end portion of the orifice inlet. The external and internal deckle means are adjustable in unison or separately, i.e. independently, whereby to vary the width and the edge thickness of the extruded film or sheet, as desired.

The external deckle means may be of known construction. The internal deckle means is in the form of a rod having a free end portion which projects into the die and bears against portions of the die which define the orifice inlet. This free end portion, preferably and for best results, has a configuration corresponding to one of those which are herein described and illustrated.

The objects of this invention include those enumerated in our said applications Ser. No. 108,459 and Ser. No. 154,138.

This invention has for a further object the provision, in extrusion die apparatus including external deckle means of the stated type, of improved internal deckle means, the external and internal deckle means being adjustable along corresponding ends of the die orifice simultaneously and in unison or separately and independently, as desired.

The objects and advantages of this invention will be apparent and manifest to persons trained in the art from the ensuing detailed description and the accompanying drawings which described and illustrate a preferred embodiment of the invention.

BRIEF DESCRIPTION OF THE DRAWINGS

FIG. 1 is a view in side elevation of a portion of a plastic extrusion die constructed in accordance with this invention, parts being broken away or shown in vertical cross section for better illustration;

FIG. 2 is a partial end view taken along line 2—2 of FIG. 1;

FIG. 3 is a partial top view taken along line 3—3 of FIG. 1;

FIG. 4 is an enlarged isometric view of an internal deckle gripping member which is also shown in FIGS. 1, 2 and 3;

FIG. 11 is a side elevation view of another preferred internal deckle means according to this invention;

FIG. 12 is a top or bottom plan view of the right end portion of FIG. 11;

FIG. 13 is an elevation view as seen from the right of FIG. 12;

FIG. 14 is a view taken along line 14—14 of FIG. 12; and

FIG. 15 is a view taken along line 15—15 of FIG. 12.

DESCRIPTION OF THE PREFERRED EMBODIMENTS

Figure 5:
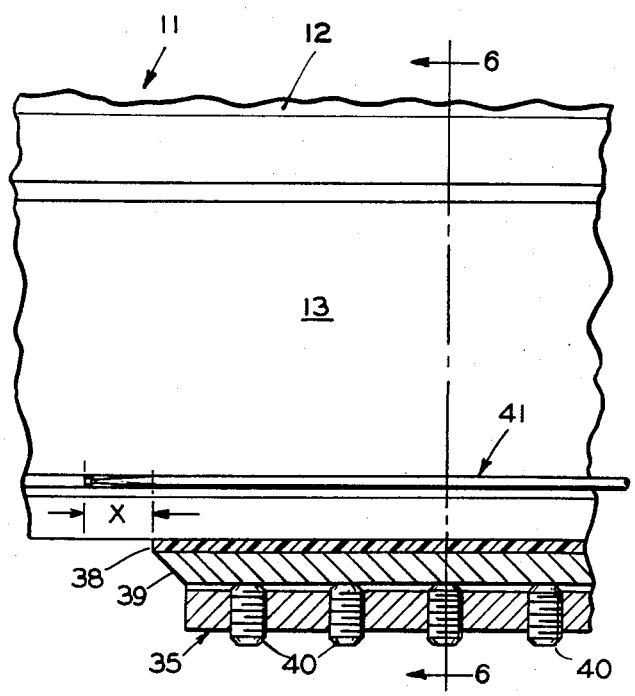
FIG. 5 is an enlarged view taken along line 5—5 of FIG. 1.
Figure 6:
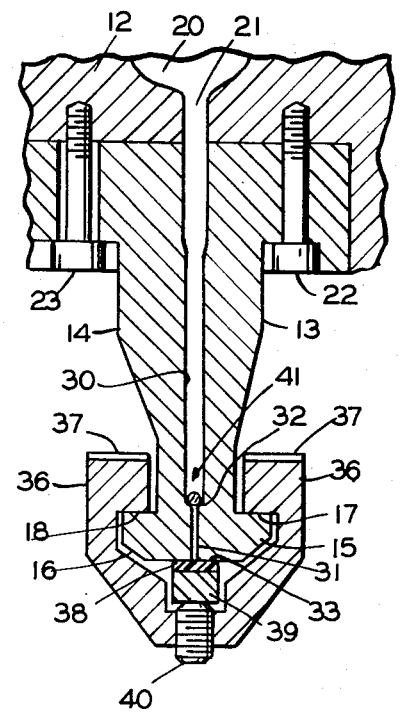
FIG. 6 is a view taken along line 6—6 of FIG. 5.

Reference is first had to FIGS. 1, 5 and 6 wherein we have illustrated a portion of a typical die 11 for use in extruding a plastic film or sheet. This die is substantially the same as the one disclosed in said U.S. Pat. No. 3,293,689 to which reference may be had for details in addition to those set forth herein. Die 11 includes a body 12 and a pair of complementary jaws 13 and 14. The jaws 13 and 14 are provided at their lower ends with respective, integral, outwardly projecting, lateral track extensions 15 and 16, having corresponding coplanar upper surfaces 17 and 18 (FIG. 6). The die body is provided with a manifold hole 20 for receiving molten plastic material from a conventional extruder or other known means (not shown). The die body is also provided with a passage 21 which communicates with the manifold hole. Both the manifold hole and the passage extend the full length of body 12.

Jaw 13 is stationary and is affixed to body 12 by screws 22. Jaw 14 is adjustable, i.e. movable toward and away from jaw 13, and is secured to the body by screws 23. Both jaws extend the full length of the body. The die jaws may be heated, as required, by suitable known electric heaters (not shown). The illustrated assembly of die body 12 and jaws 13 and 14 is closed off at each end by a unit 24 (FIG. 1). Unit 24 comprises a block 25 which is secured to body 12 by screws 26. Block 25 is provided with a through passage 27 and carries a pair of pinions 28 which are positioned to opposite sides of the block and are rotatable about a common horizontal axis 29.

Opposing faces of jaws 13 and 14 are machined their full lengths to define a passage 30 and a discharge orifice 31 having the shape or form of a relatively long narrow slot which is narrower than passage 30. The upper extremity 32 of orifice 31 constitutes its inlet and lower extremity 33 constitutes its outlet (FIG. 6). Passages 21 and 30 and orifice 31 are in a common vertical plane and are aligned for communication with manifold hole 20 whereby molten plastic admitted into the manifold hole is transmitted to and through the discharge orifice. The respective surface portions of the jaws which define the lower end of passage 30 are convergent and at corresponding angles of about 45° to the horizontal. The block passage 27 is aligned with the lower portion of passage 30.

The earlier referred-to external deckle means is preferably the same as that of said U.S. Pat. No. 3,293,689 and comprises a generally U-shaped body 35 (FIG. 6) which is slidable along the die jaws. Body 35 includes a pair of inwardly projecting rail extensions 36 which ride on and along corresponding upper surfaces 17 and 18 of respective track extensions 15 and 16. Each extension 36 is formed with a series of upwardly projecting, parallel teeth 37 and serves as a rack. As is best shown in FIG. 1, pinions 28 mesh with rack teeth 37 of corresponding rail extensions 36 whereby rotation of the pinions in either direction effects sliding movement of body 35 in a corresponding direction relative to jaws 13 and 14.

The external deckle means also includes a deckle bar 38, a backing piece 39 and a plurality of set screws 40 which extend through corresponding taps in the web of U-shaped body 35 and engage and exert upward pressure on the backing piece so as to maintain the deckle bar in close contact with the surfaces of the die jaws that are adjacent orifice outlet 33. The die is equipped at its other end with a like external deckle means.

Figure 7:
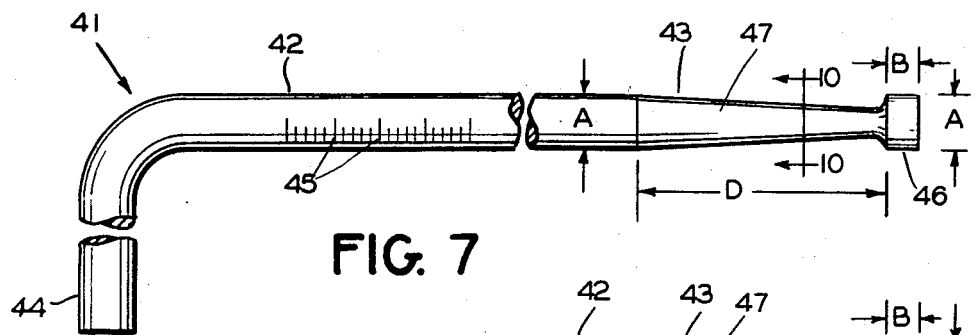
FIG. 7 is a side elevation view of a preferred internal deckle means according to this invention.
Figure 8:
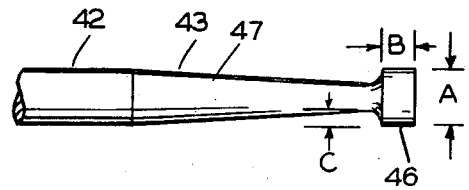
FIG. 8 is a top or bottom plan view of the right end portion of FIG. 7.
Figure 9:
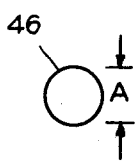
FIG. 9 is an elevation view as seen from the right of FIG. 8.
Figure 10:
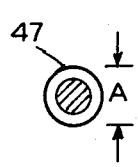
FIG. 10 is a view taken along line 10—10 of FIG. 7.

Reference is next had to FIGS. 8 through 10 for an understanding of one preferred internal deckle means 41 according to this invention. This deckle means is made from a right circular cylindrical metal rod and consists of an elongated rectilinear body part 42, an inner end part 43 and an outer end part 44 which is bent and at a right angle to the body part. The portion of body part 42 adjacent end part 44 is provided with a series of longitudinally spaced graduations 45 (FIG. 7). Inner end part 43 consists of a first portion 46 and a second portion 47 which is intermediate portion 46 and part 42. Portion 46 constitutes the inner end of the rod and is right circular cylindrical. The diameter of portion 46 is the same as that of part 42. Portion 47 is frusto-conical and tapers inwardly in the direction of portion 46.

We have found that: the diameters of part 42 and portion 46, which is identified by A in the drawings, should be within the range of from 0.075 to 0.250 inches for satisfactory results and approximately 0.1 inch for best results; the length of portion 46, which is identified by B in the drawings, should be within the range of from 0.125 to 1 inch for satisfactory results and within the range of from 0.125 to 0.50 inches for best results; that the clearance between the part of smallest diameter of portion 47 and portion 46, which is identified by C in the drawings, should be within the range of from 0.0005 to 0.050 inches for satisfactory results and within the range of from 0.002 to 0.020 inches for best results; and that the length of portion 47, which is identified by D in the drawings, should be within the range of from 1 to 3 inches for satisfactory results and within the range of from 1.25 to 2.50 inches for best results.

As is best shown in FIGS. 1 and 6, deckle means 41 extends through block passage 27 and its forward portion is positioned along the lower end of passage 30.

Part 42 also extends through a guide sleeve 50 which is externally threaded at each end for engagement with a tap (not shown) in block 25 and with an internally threaded tubular follower 51. A sealing ring 52 is interposed between sleeve 50 and follower 51.

This invention includes a coupling means 53 for releasably connecting the external deckle means to the internal deckle means whereby both deckle means may be operated in unison or independently, as desired. Coupling means 53 is illustrated in detail in FIGS. 1 through 4 and comprises a plate 54 which is positioned across the outer end of U-shaped member 35 and is affixed thereto by screws 55. Plate 54 has a through opening 56 which is partially tapped to receive a tapered threaded tubular member 57 which is best shown in FIG. 4. The threaded portion of member 57 is slotted, as indicated at 58 in FIG. 4, to obtain split end parts 59. This member has a square head 60 for engagement by a suitable turning tool. It will be evident from an examination of FIGS. 1 and 4 that when member 57 is turned in one direction it advances along opening 56. This causes the split end parts 59 to flex toward each other, thereby gripping internal deckle means part 42 and securing the same to plate 54. When member 57 is turned in a reverse direction, it releases and permits the internal deckle means to be adjusted manually and independently of the external deckle means.

For the purpose of describing the operation of the above described embodiment of the invention, it is assumed that the parts are in the relative position shown in FIGS. 1, 5 and 6. It is also assumed that molten plastic material is fed to die manifold hole 20 by a suitable known type of extruder. The molten plastic passes successively through passages 21 and 30 and then through orifice 31 from whence it is discharged as a film. The width of the film is determined by the position of the external deckle means, particularly deckle bars 38, and the thickness of the film by various factors including the width of orifice 31. The internal deckle rod 41 serves as a means for reducing the flow of plastic material at the edges of the film and thereby results in uniform film thickness with controlled width.

It will be apparent that the pressure of the plastic material in passage 30 exerts a force on internal deckle rod 41. This presses the deckle rod against the inclined surfaces at the lower end of passage 30 and provides an effective seal so that little, if any, of the plastic material leaks past the deckle rod. The diameter of the deckle rod is slightly less than the minimum width of passage 30. It will be appreciated that minor adjustments of die jaw 14 toward or away from fixed die jaw 13, for the purpose of adjusting the width of orifice 31, can be made without adversely affecting the sealing of the internal deckle rod.

Reference is now had to FIGS. 11 through 15 for an understanding of another preferred internal deckle means 51 according to this invention. This deckle means is also made from a right circular cylindrical metal rod and is configurationally and dimensionally the same as earlier described internal deckle means 41 in a number of respects. Deckle means 51 consists of an elongated rectilinear body part 52, an inner end part 53 and an outer end part 54 which is bent and at a right angle to the body part. As in the case of deckle means 41, body part 52 is provided with a series of longitudinally spaced graduations 55 (FIG. 12). Inner end part 53 consists of a first portion 56 and a second portion 57 which is intermediate portion 56 and body part 52. Portion 56 constitutes the inner end of the rod and is right circular cylindrical. The diameter of portion 56 is the same as that of part 52. Portion 57 consists of a frusto-conical first section 58, which is a continuation of body part 52 and which tapers inwardly in the direction of end portion 56; and a right circular cylindrical second section 59 which extends between section 58 and end portion 56. It will be noted that deckle means 51 is the same as deckle means 41 except that it additionally includes the section 59 of uniform diameter arranged as illustrated.

For satisfactory results, and for best results, the dimensions A, B, C and D of deckle means 51 should be within the corresponding ranges set forth earlier herein with respect to deckle means 41. Further, as regards deckle means 51, the length of section 59, which is identified by E in the drawings, should be within the range of from 0.25 to 1.50 inches for satisfactory results and within the range of from 0.50 to 1 inch for best results.

It has been found that the configuration and dimensions of the inner end part 43 of deckle means 41 or of inner end part 53 of deckle means 51 and the distance X from the inner end of either of these deckle means to the end of corresponding deckle bar 38, are of major importance in obtaining uniform film thickness. For optimum results, the offset distance X should be within the range of from 0.25 to 4 inches, depending on the particular plastic material. The above indicated parameters are markedly affected by the characteristics of the specific plastic material being run, especially by its viscosity.

Based on the foregoing, it is believed that the construction, operation, objects and advantages of our present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interpreted as illustrative only and not in a limiting sense.

We claim:

1. In combination with a die for extruding a film or sheet of flowable plastic material and having a discharge orifice in the form of a relatively long narrow slot, said orifice having an inlet coextensive with the length of the slot and communicating with a manifold for containing a supply of the plastic material in a molten state and having an outlet coextensive with the length of the slot and communicating with the atmosphere, a. external deckle means carried by the die and sealing an end portion of the orifice outlet, and
   b. internal deckle means extending into the die and sealing an end portion of the orifice inlet corresponding to said end portion of the orifice outlet, said internal deckle means comprising a rod including rectilinear first and second parts within the die, said first part being circular in transverse cross section, said second part being an extension of the first part and comprising a first portion constituting an end of the rod and a second portion intermediate the first portion and the first part, said first portion being circular in transverse cross section and having a diameter substantially equal to that of the first part, said second portion comprising a frusto-conical first section which tapers inwardly in the direction of the first portion.

2. The combination according to claim 1 wherein the external deckle means comprises a deckle bar which bears against the die and bridges said end portion of the orifice outlet and which terminates in an inner end, said first portion of the rod terminating in a free end which is located in the die at a point beyond the inner end of the deckle bar nd which is offset therefrom a distance within the range of from about 0.25 to about 4 inches as measured along the rod.

3. The combination according to claim 2 wherein the diameters of the first part and the first portion are substantially the same and are within the range of from 0.075 to 0.250 inches, the length of the first portion is within the range of from 0.125 to 1 inch, the clearance between the part of smallest diameter of the second portion and the first portion is within the range of from 0.0005 to 0.050 inches, and the length of the second portion is within the range of from 1 to 3 inches.

4. The combination according to claim 3 wherein the second portion also comprises a right circular cylindrical second section disposed between the first section and the first portion, the length of the second section being within the range of from 0.25 to 1.50 inches.

5. The combination according to claim 2 wherein the diameters of the first part and the first portion are approximately 0.1 inch, the length of the first portion is within the range of from 0.125 to 0.50 inches, the clearance between the part of smallest diameter of the second portion and the first portion is within the range of from 0.002 to 0.020 inches, and the length of the second portion is within the range of from 1.25 to 2.50 inches.

6. The combination according to claim 5 wherein the second portion also comprises a right circular cylindrical second section disposed between the first section and the first portion, the length of the second section being within the range of from 0.50 to 1 inch.

7. The combination according to claim 1 including
a. coupling means releasably connecting the internal deckle means to the external deckle means to permit adjustment of both deckle means relative to the die in unison.

8. The combination according to claim 5 wherein the external deckle means comprises a deckle bar which bears against the die and bridges said end portion of the orifice outlet and which terminates in an inner end, said first portion of the rod terminating in a free end which is located in the die at a point beyond the inner end of the deckle bar and which is offset therefrom a distance within the range of from about 0.25 to about 4 inches as measured along the rod.

9. The combination according to claim 6 wherein the diameters of the first part and the first portion are substantially the same and are within the range of from 0.075 to 0.250 inches, the length of the first portion is within the range of from 0.125 to 1 inch, the clearance between the part of smallest diameter of the second portion and the first portion is within the range of from 0.0005 to 0.050 inches, and the length of the second portion is within the range of from 1 to 3 inches.

10. The combination according to claim 9 wherein the second portion also comprises a right circular cylindrical second section disposed between the first section and the first portion, the length of the second section being within the range of from 0.25 to 1.50 inches.

11. The combination according to claim 6 wherein the diameters of the first part and the first portion are approximately 0.1 inch, the length of the first portion is within the range of from 0.125 to 0.50 inches, the clearance between the part of smallest diameter of the second portion and the first portion is within the range of from 0.002 to 0.020 inches, and the length of the second portion is within the range of from 1.25 to 2.50 inches.

12. The combination according to claim 11 wherein the second portion also comprises a right circular cylindrical second section disposed between the first section and the first portion, the length of the second section being within the range of from 0.50 to 1 inch.

* * * * *